(12) United States Patent
Winter et al.

(10) Patent No.: US 7,121,467 B2
(45) Date of Patent: Oct. 17, 2006

(54) INDICATORS OF OPTIMUM POSITIONING OF A DATA COLLECTION DEVICE FOR READING DATA CARRIERS, SUCH AS RFID TAGS AND MACHINE-READABLE SYMBOLS

(75) Inventors: Steven J. Winter, Stanwood, WA (US); Rene D. Martinez, Seattle, WA (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 10/850,966

(22) Filed: May 21, 2004

(65) Prior Publication Data
US 2005/0258252 A1   Nov. 24, 2005

(51) Int. Cl.
*G06K 7/10* (2006.01)
(52) U.S. Cl. .............................. 235/462.2; 235/462.01; 235/472.02; 235/462.08
(58) Field of Classification Search ........... 235/462.08, 235/462.2, 472.02, 462.01
See application file for complete search history.

(56) References Cited

U.S. PATENT DOCUMENTS

| | | | |
|---|---|---|---|
| 4,730,104 A * | 3/1988 | Rogers | 235/412 |
| 5,382,784 A | 1/1995 | Eberhardt | 235/472 |
| 5,659,167 A * | 8/1997 | Wang et al. | 235/472.01 |
| 5,763,867 A | 6/1998 | Main et al. | 235/472 |
| 5,825,010 A * | 10/1998 | Charych et al. | 235/472.01 |
| 5,945,661 A * | 8/1999 | Nukui et al. | 235/462.45 |
| 6,206,288 B1 | 3/2001 | May et al. | 235/462.11 |
| 6,415,978 B1 * | 7/2002 | McAllister | 235/462.01 |
| 2002/0074402 A1 | 6/2002 | Latimer et al. | 235/454 |
| 2003/0141366 A1 | 7/2003 | Hartmann | 235/451 |
| 2005/0011952 A1 * | 1/2005 | Krichever | 235/454 |

FOREIGN PATENT DOCUMENTS

EP    0 926 582    6/1999

* cited by examiner

*Primary Examiner*—Daniel Stcyr
*Assistant Examiner*—Daniel A. Hess
(74) *Attorney, Agent, or Firm*—Seed IP Law Group PLLC

(57) ABSTRACT

A data collection device for reading barcodes, matrix codes, acoustical tags, radio frequency identifier (RFID) tags, and other data carriers. The data collection device includes components to determine an actual position of the data collection device with respect to a target data carrier. The data collection device further includes visual indicators to indicate the determined actual position relative to an optimal position of the data collection device relative to the target data carrier. The determined actual position can be at least one of an actual distance or an actual orientation of the data collection device relative to the target data carrier.

36 Claims, 8 Drawing Sheets

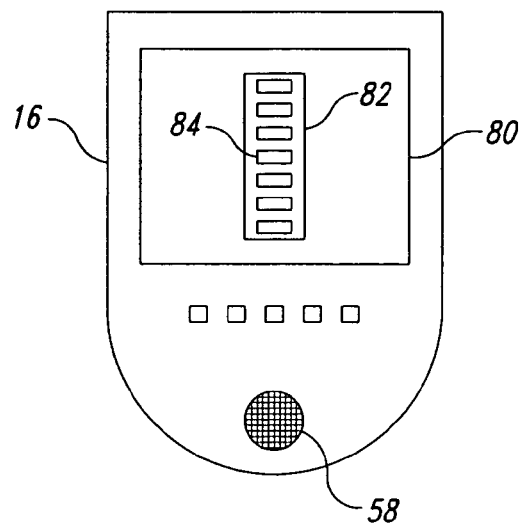
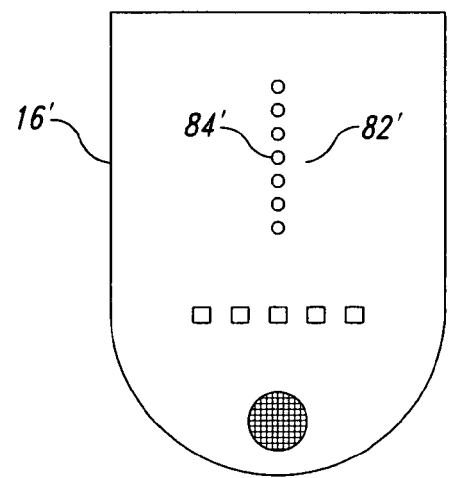
FIG. 5A
FIG. 5B
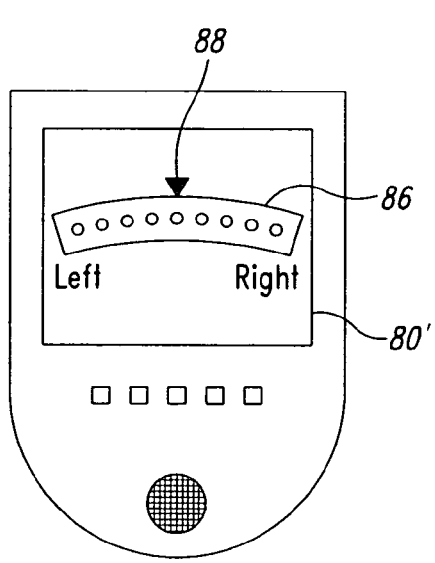
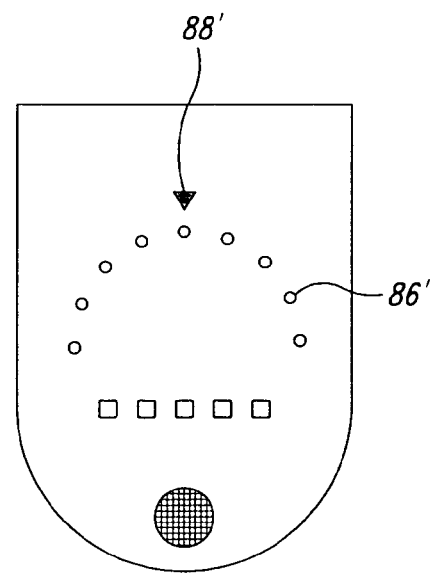
FIG. 6A
FIG. 6B

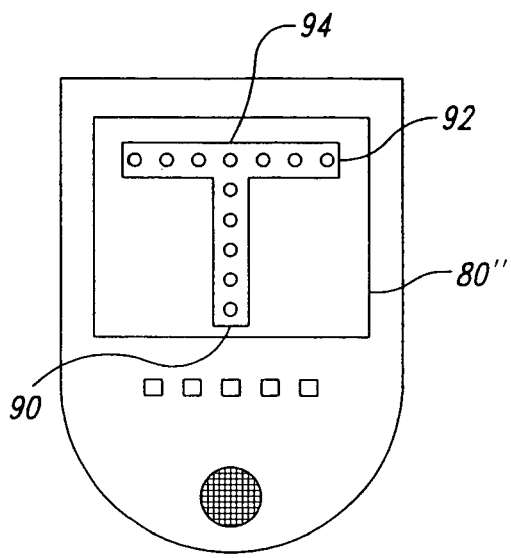
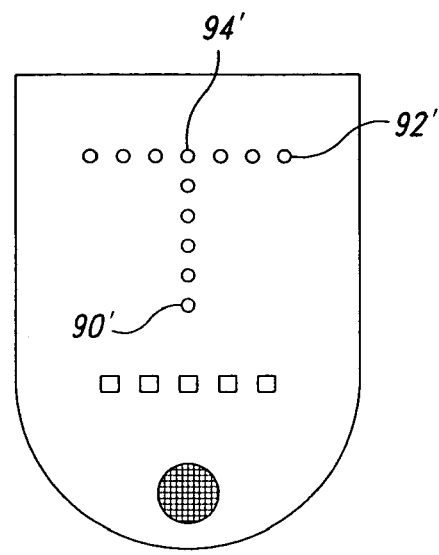
FIG. 7A
FIG. 7B
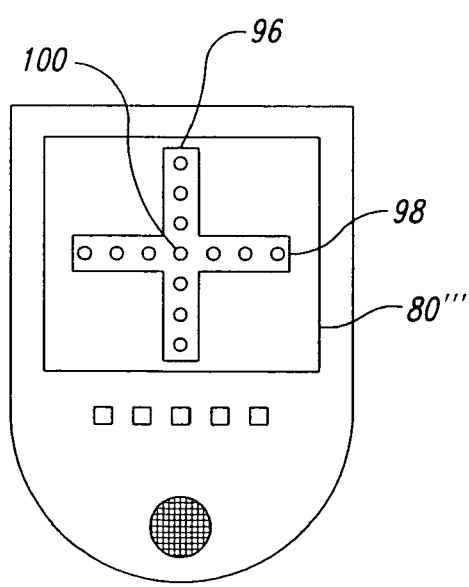
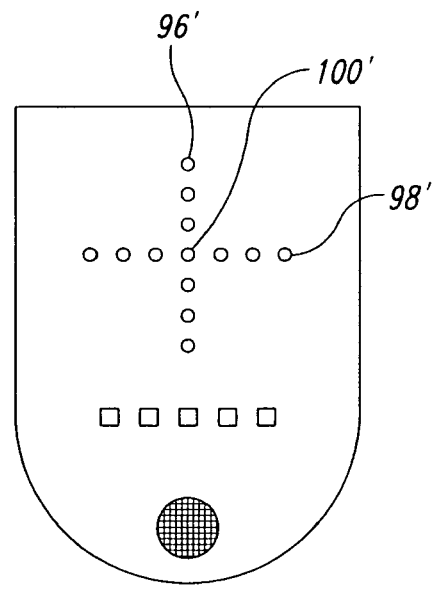
FIG. 8A
FIG. 8B

INDICATORS OF OPTIMUM POSITIONING OF A DATA COLLECTION DEVICE FOR READING DATA CARRIERS, SUCH AS RFID TAGS AND MACHINE-READABLE SYMBOLS

TECHNICAL FIELD

The present disclosure relates generally to electronic devices for reading data carriers, such as machine-readable symbols (e.g., barcode symbols and the like) and wireless memory devices (e.g., RFID tags), and more particularly but not exclusively, relates to visual techniques to indicate whether a data collection device is positioned optimally for reading such data carriers, and/or visual techniques to locate the wireless memory devices.

BACKGROUND INFORMATION

A variety of methods exist for tracking and providing information about items. For example, inventory items typically carry printed labels providing information such as serial numbers, price, weight, and size. Data carriers in the form of machine-readable symbols can be selected from a variety of machine-readable symbologies, such as barcode and/or area or matrix code symbologies.

Data carriers in the form of memory devices provide an alternative method for tracking and providing information about items. Memory devices permit the linking of large amounts of data with an object or item. Memory devices typically include a memory and logic in the form of an integrated circuit (IC) and means for transmitting data to and/or from the device. For example, a radio frequency identification (RFID) tag typically includes a memory for storing data, an antenna, an RF transmitter, and/or an RF receiver to transmit data, and logic for controlling the various components of the memory device. RFID tags are generally formed on a substrate and can include, for example, analog RF circuits and digital logic and memory circuits. The RFID tags can also include a number of discrete components, such as capacitors, transistors, and diodes.

RFID tags can be passive, active or hybrid devices. Active devices are self-powered, by a battery for example. Passive devices do not contain a discrete power source, but derive their energy from an RF signal used to interrogate the RFID tag. Passive RFID tags usually include an analog circuit that detects and decodes the interrogating RF signal and that provides power from the RF field to a digital circuit in the tag. The digital circuit generally executes all of the data functions of the RFID tag, such as retrieving stored data from memory and causing the analog circuit to modulate the RF signal to transmit the retrieved data. In addition to retrieving and transmitting data previously stored in the memory, the RFID tag can permit new or additional information to be stored in the RFID tag's memory, or can permit the RFID tag to manipulate data or perform some additional functions.

Another form of memory device is an optical tag. Optical tags are similar in many respects to RFID tags, but rely on an optical signal to transmit data to and/or from the tag.

A user typically secures a data carrier to an item, such as a goods, products, or containers by way of pressure-sensitive adhesives. The data carrier often encodes information specifically relating to the item such as identifying or destination information. An individual, such as a checkout or inventory clerk, can retrieve data about any given item, for example, by scanning the machine-readable symbol or interrogating the RF tag, optical tag, or touch memory device. Access to the data can be useful at the point of sale, during inventory, during transportation, or at other points in the manufacture, distribution, sale, or use of the tagged item.

Whatever the type of data carrier used, their usefulness is limited by the capability of a data collection device (such as a barcode reader, RFID reader, optical reader, and the like) to accurately read the data on the data carrier. Data collection devices are directional in nature and have limited range—such devices need to be optimally positioned in order to accurately read the data on the data carriers. If the data collection is pointed too far (or too close in some instances) to the data carrier, then the data may not be read correctly or may not be read at all. Similarly, if the data collection device is pointed askew to the data carrier, then the data may not be read or may be read incorrectly. Moreover, the data collection device may not be able to provide sufficient power to the data carrier (such as a RFID tag) if the data collection device is not optimally positioned to apply maximum power on the tag. This non-optimal positioning would inhibit both successful reading and writing. The inability of an inexperienced user to skillfully position the data collection device also contributes to the directional and range-limited liabilities of such devices, thereby further contributing to the chances of erroneous or missed data readings and/or ineffective data transfer (i.e., writing) to the data carrier.

BRIEF SUMMARY OF THE INVENTION

One aspect provides an automatic data collection device for reading data carriers such as machine-readable symbols and radio frequency identification transponders. The automatic data collection device includes a housing, a symbol reading means carried by the housing for optically reading information encoded in machine-readable symbols, and a radio frequency identification reading means carried by the housing for wireless reading information stored in radio frequency identification transponders.

A position determining means is carried by the housing for determining at least one of: 1) at least an approximate distance between the automatic data collection device and a target data carrier relative to an optimal distance between the automatic data collection device and the target data carrier, and 2) at least an approximate orientation of the automatic data collection device with respect to the target data carrier relative to an optimal orientation between the automatic data collection device and the target data carrier.

A visual indication means is carried by the housing for providing a visual indication of the determined at least one of: 1) at least an approximate distance between the automatic data collection device and a target data carrier relative to an optimal distance between the automatic data collection device and the target data carrier, and 2) at least an approximate orientation of the automatic data collection device with respect to the target data carrier relative to an optimal orientation between the automatic data collection device and the target data carrier.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified.

FIGS. 5A–9B show various embodiments of visual indicators for the data collection device(s) of FIGS. 1–4.

DETAILED DESCRIPTION

Figure 1:
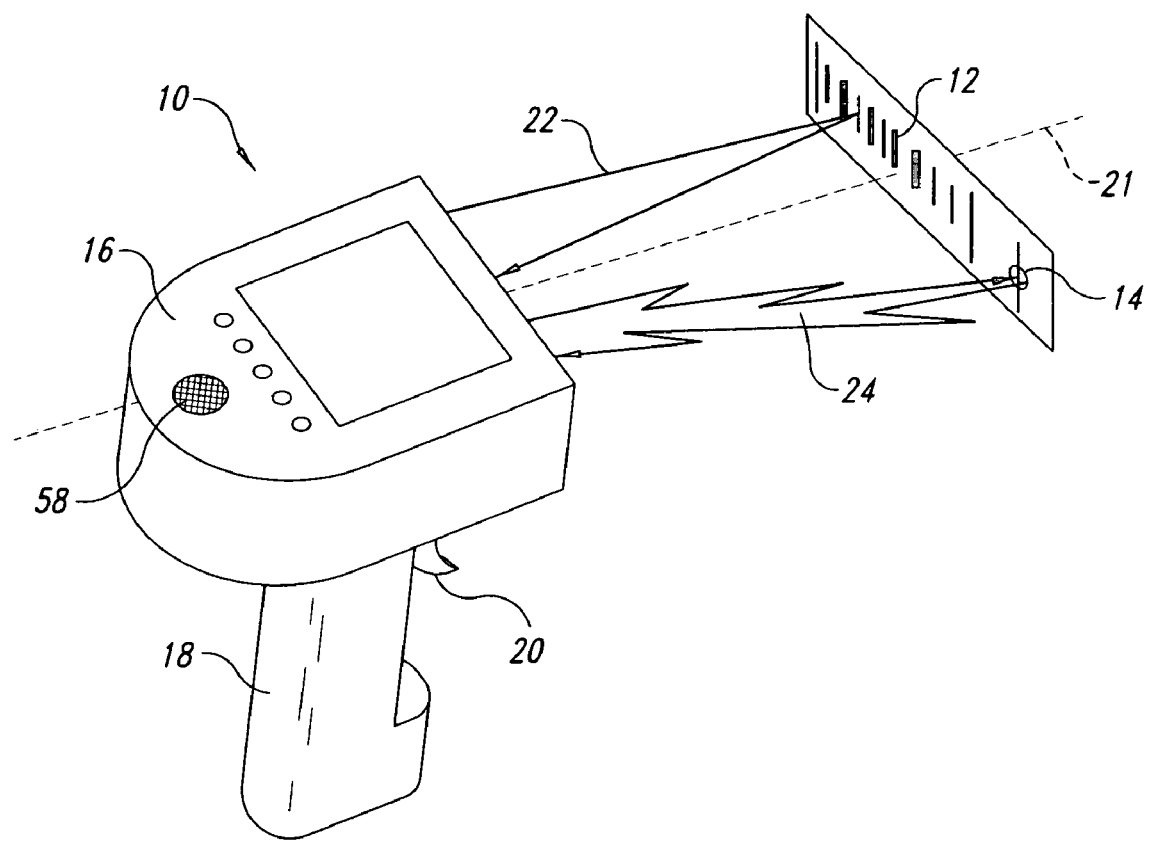
FIG. 1 is an upper perspective view of an embodiment of a data collection device interrogating and/or reading at least one data carrier.

Embodiments of techniques for indicating whether a data collection device is optimally positioned for reading data carriers are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments As an overview, a data collection device of an embodiment is provided for reading barcodes, RFID tags, matrix codes, stacked codes, acoustical tag, or other data carrier or machine-readable symbols. The data collection device includes at least one position determination component to determine an actual or at least approximate position of the data collection device relative to a target data carrier. For example, the position determination component can determine a distance and orientation of the data collection device relative to the target data carrier. A variety of different techniques can be embodied by the position determination component(s) to determine the position of the data collection device, including but not limited to, use of output and input transducers to respectively emit signals (such as electromagnetic or acoustical signals) and receive signals returned from the target data carrier. Characteristics or properties of these returned signals can be processed to determine the position of the data collection device relative to the target data carrier.

The actual position of the data collection device relative to an optimum position is indicated by visual indicators. The visual indicators of an embodiment comprise a line of pixels, LCDs, or other indicators. An optimum position indicator can be provided by the visual indicators to allow a user of the data collection device to more readily ascertain distance and orientation of the data collection device relative to the target data carrier.

In one embodiment, the data collection device can be used to locate a target data carrier, such as a RFID tag. In such an embodiment, the data collection device can use visual indicators, which may be based on strength of one or more signals received from the RFID tag, to locate or otherwise search for the RFID tag if the position of the RFID tag is not initially unknown.

FIG. 1 shows an automatic data collection device 10 for reading one or more target data carriers, such a barcode 12 and a tag 14 (such as an active or passive RFID tag, an acoustical tag, and the like). While the barcode 12 is illustrated, it is appreciated that the data carrier may be embodied as a matrix code or stacked code as well. For the sake of simplicity of explanation hereinafter, the various descriptions of embodiments will be in the context of the barcode 12 and the tag 14 in the form of an RFID tag.

The data collection device 10 includes a head 16, a handle 18 and a trigger 20. While the trigger 20 is shown with a specific shape and in a specific location in the embodiment of FIG. 1, other embodiments may employ different arrangements. For example, the trigger 20 can be embodied as a side-mounted finger trigger, top-mounted thumb trigger, button or key, touch screen, and other trigger arrangements. One embodiment further provides a proximity trigger 20, which uses optics, acoustics, or other mechanism to determine proximity of an object to automatically activate. A broken line represents a line-of-sight axis 21 that extends from the data collection device 10 to the data carrier.

The data collection device 10 can comprise a portable data collection device, a hand-held scanning device, or other suitable electronic device having the various data reading and/or writing capabilities described herein and further including capability for determining and indicating position. It is appreciated that some embodiments are provided that may not necessarily have the same shape or identical features or identical use as the embodiments illustrated in the various figures. However, such embodiments can nevertheless include features for determining position and for providing indication of the position.

The barcode 12 can be read using an illumination 22 that is directed to and reflected from the barcode 12. The illumination 22 can comprise a laser beam or flood illumination, for example. The tag 14 can be read using electromagnetic radiation, radio frequency, acoustical energy, and the like (generically depicted as energy 24) that is directed to and returned from the tag 14. As will be described below, the reflected illumination 22, returned energy 24, and/or other signal(s) are used by an embodiment to determine whether the data collection device 10 is optimally positioned with respect to the target data carrier.

Figure 2:
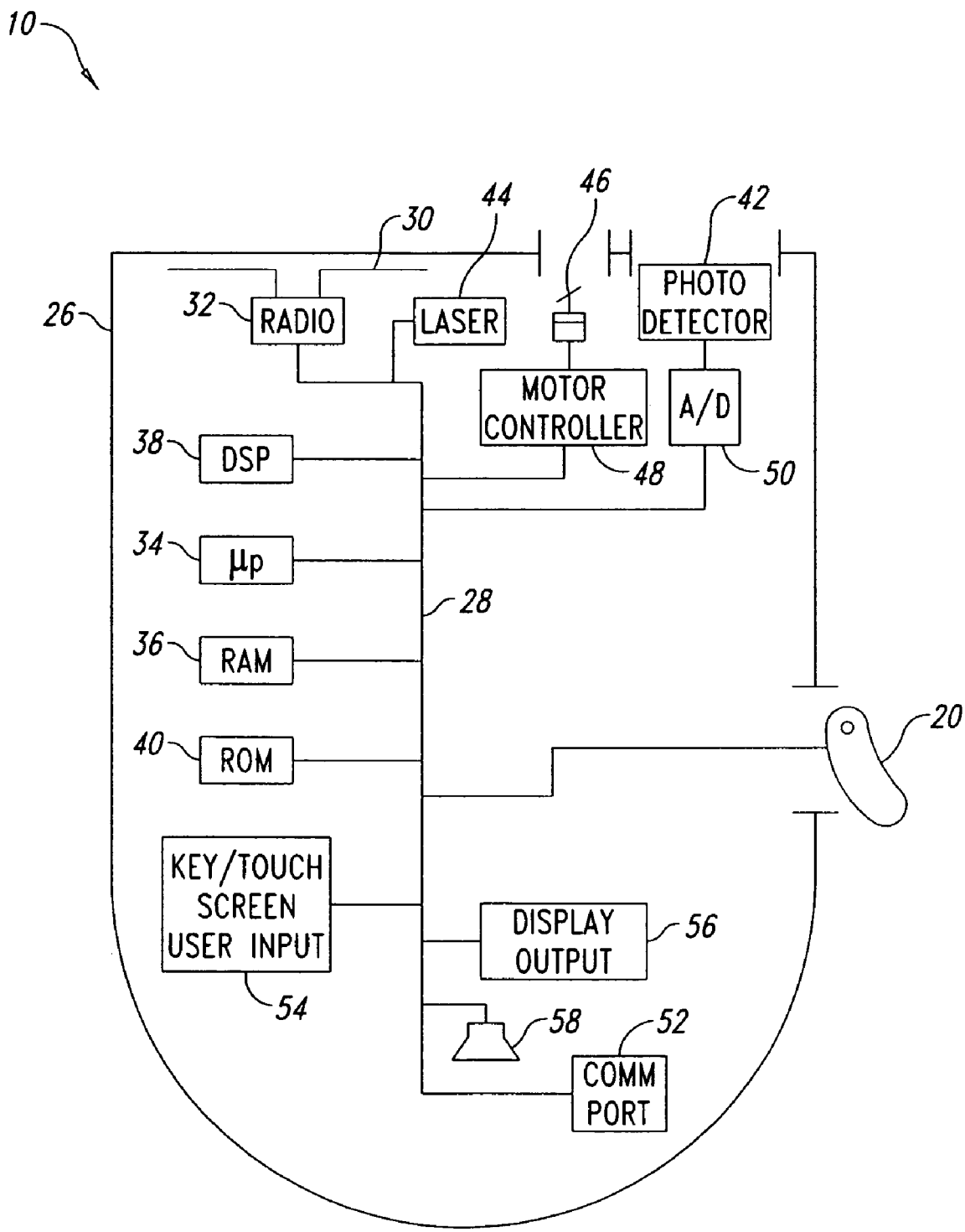
FIG. 2 is as block diagram of an embodiment of a data collection device.

As shown in the embodiment of FIG. 2, the data collection device 10 has a housing 26 that carries various components, symbolically shown as being coupled together via a bus 28. The bus 28 provides data, commands, and/or power to the various components of the data collection device 10. The data collection device 10 can include an internal power source such as a rechargeable battery (not shown), or can receive power from an external power source such as a wall outlet by way of an electrical cord (not shown).

With regards to components associated with wirelessly reading information stored in an RFID tag, FIG. 2 shows an antenna 30 electrically coupled to a radio 32. The radio 32 is coupled via the bus 28 to a microprocessor 34 (or other processor) and a random access memory (RAM) 36. The RAM 36 can include one or more buffers or other storage locations to store information read from an RFID tag and/or to store other information associated with determining whether the data collection device 10 is optimally positioned.

While FIG. 2 shows a single microprocessor 34, the data collection device 10 may include separate dedicated processors for reading RFID tags, acoustical tags, barcodes, other machine-readable symbols, and the like. Moreover, in one example embodiment at least one digital signal processor (DSP) 38 may be provided to cooperate with the microprocessor 34 to process signals and data returned from the data carriers. Such signal processing may be performed for purposes of either or both reading data from signals received from the target data carrier, and determining an actual position of the data collection device 10 based on at least one characteristic (such as signal strength) of a signal returned from the data carrier.

While a dipole antenna 30 is shown, the data collection device 10 can employ other antenna designs. Of course, the antenna 30 can be selected to achieve a particular focus, for example, a highly directional antenna can enhance the ability of the data collection device 10 to select a single RFID tag out of a group of RFID tags. The radio 32 can take the form of a transceiver capable of transmitting and receiving at one or more of the frequencies commonly associated with RFID tags 12 (e.g., 350 kilohertz, 400 kilohertz, 900 kilohertz, 2.4 gigahertz, and others). While these frequencies typically fall within the radio frequency range of the electromagnetic spectrum, the radio 32 can successfully employ frequencies in other portions of the spectrum. Antenna design and radios are generally discussed in The ARRL Handbook for Radio Amateurs 2003, by Dana George Reed (Editor), American Radio Relay League, Newington, Conn., U.S.A. (October 2002) (ISBN: 0872591921), and in commonly assigned U.S. Pat. No. 6,278,413, issued Aug. 21, 2001, entitled ANTENNA STRUCTURES FOR WIRELESS COMMUNICATIONS DEVICE, SUCH AS RFID TAG.

In an embodiment the antenna 30 and radio 32 can be used for locating a wireless data carrier, such as an RFID tag. For example, if the RFID tag is not readily visible to the user, the user can use the data collection device A read only memory (ROM) 40 stores instructions for execution by the microprocessor 34 to operate the radio 32 or other components of the data collection device 10. As used in this herein, ROM includes any non-volatile memory, including erasable memories such as EEPROMs. The programmed microprocessor 34 can control the radio 32 to emit an interrogation signal, including any required polling codes or encryption, and to receive a return signal from an RFID tag.

In an embodiment, the ROM 40 or other machine-readable storage medium in the data collection device 10 can store software or other machine-readable instructions executable by the microprocessor 34 to determine whether the data collection device 10 is optimally positioned for reading a data carrier. The ROM 40 or other storage medium can also store data (such as deviation data in a lookup table, database, variables, and so on) usable for determining whether a current position of the data collection device is within an acceptable deviation from an acceptable position. Alternatively or additionally, software or other machine-readable instructions can be executed to compute deviation on a more dynamic basis.

FIG. 2 also shows symbol reading components of the data collection device 10 for reading the barcode 12. The symbol reading components are in the form of a photo detector 42 and scanning illumination source to provide the illumination 22, such as a laser 44. The data collection device 10 can employ suitable optics such as lens and mirrors 46, controlled by a motor controller 48, for directing modulated light reflected from the data carrier to the photo detector 42. Alternatively or additionally, the lens and mirrors 46 and motor controller 48 can be used for directing the illumination 22 (such as a laser beam) from the laser 44 to the target data carrier.

An analog-to-digital (A/D) converter 50 transforms the analog electrical signals from the photo detector 42 into digital signals for use by the microprocessor 34. The bus 28 couples the digital data from the A/D converter 50 to the microprocessor 34 and the RAM 36.

Symbol reading and decoding technology is well known in the art and will not be discussed in further detail. Many alternatives for image sensors, symbol decoders, and optical elements that can be used in the data collection device 10 are taught in the book, The Bar Code Book, Third Edition, by Roger C. Palmer, Helmers Publishing, Inc., Peterborough, N.H., U.S.A. (1995) (ISBN 0-911261-09-5). Useful embodiments can also be derived from the various components disclosed in U.S. Pat. No. 6,286,763, issued Sep. 11, 2001, and assigned to the same assignee as the present application.

The data collection device 10 can include a communication port 52 to provide communications to external devices. The communication port 53 can be a hardwire or wireless interface, and can even employ the antenna 42 and radio 44. The communication port 52 can provide communications over a communications network (not shown) to a host (not shown), allowing transmissions of data and/or commands between the data collection device 10 and the host. The communications network can take the form of a wired network, for example a local area network (LAN) (e.g., Ethernet, Token Ring), a wide area network (WAN), the Internet, the World Wide Web (WWW), wireless LAN (WLAN), wireless personal area network (WPAN), and other network. Alternatively or additionally, the communications network can be a wireless network, for example, employing infrared (IR), satellite, and/or RF communications.

The data collection device 10 includes a keypad, mouse, touch screen, or other user input device 54 to allow user input. It is appreciated that other devices for providing user input can be used. The user input device 54 is usable to allow the user to select modes (e.g., modes for reading barcodes or other symbols, RFID tags, optical tags, etc.), turn the data collection device on/off, adjust power levels, and others. The bus 28 couples the user input device 54 to the microprocessor 34 to allow the user to enter data and commands.

In the symbol-reading mode, the microprocessor 34 decodes and retrieves the data encoded in the data carrier, as received and processed by the photo detector 42 and the A/D converter 50. The DSP 38 may also be used to process the received data. In the RFID tag-reading mode, the microprocessor 34 operates the radio 32 to emit an interrogation signal and to receive a response from one or more RFID tags to the interrogation signal. The microprocessor 34 decodes the response signal to retrieve the data encoded in the RFID tag.

The bus 28 also couples the trigger 20 to the microprocessor 34. In response to activation of the trigger 20, the microprocessor 34 can cause the laser 44 to emit a laser beam when the data collection device 10 is operating in the symbol-reading mode. In one embodiment, the microprocessor 34 can also cause the radio 32 and antenna 30 to emit an interrogation signal in response to the activation of the trigger 20 while the data collection device 10 is operating in the RFID tag-reading mode.

The data collection device 10 includes human-perceptible visual (e.g., display output) and audio indicators 56 and 58 respectively. The bus 28 couples the visual and audio indicators 56 and 58 to the microprocessor 34 for control thereby. As will be described later, the visual indicators 56 take a variety of forms, for example: light emitting diodes (LEDs) or a graphic display such as a liquid crystal display (LCD) having pixels, wherein such visual indicators 56 provide an indication of an actual position (e.g., distance and orientation between the data collection device and a data carrier being read) relative to an optimum position. Graphical visual indicators 56 can also be provided to indicate at least an approximate distance and/or orientation, for example, a compass-type graphic and/or a "gas-gauge" type graphic. These or other visual indicators can also provide other data associated with the operation of the data collection device 10, such as visual indicators to indicate whether the data collection device 10 is on/off, reading, interrogating, low on battery power, successful or unsuccessful reads/interrogations, and so forth.

The audio indicator 58 can take the form of one or more dynamic, electrostatic or piezo-electric speakers, for example, operable to produce a variety of sounds (e.g., clicks and beeps), and/or frequencies (e.g., tones), and to operate at different volumes. Such sounds can convey various types of information, such as whether a data carrier was successfully or unsuccessfully read.

With regards to determining whether the data collection device 10 is optimally positioned for reading a target data carrier, one embodiment examines the strength of signals returned from the target data carrier. In the context of the laser 44 that scans the barcode 12 with a laser beam and the photodetector 42 that detects the reflected laser beam, the amplitude of the detected reflected laser beam is indicative of the position of the data collection device 10 relative to the barcode 12. For example, if the data collection device 10 is aimed centrally to the barcode 12 but is too close in range, then the intensity of light reflected from the barcode 12 will be relatively low with respect to the left- and right-hand portions of the barcode 12 as compared to light reflected from its central portion, as the laser 44 scans the barcode 12 from left to right. If the data collection device is aimed centrally to the barcode 12 but is too far out of range, then the intensity of the reflected light will generally be low (e.g., below some acceptable threshold level or level detectable by the photo detector 42) across the entire barcode 12. If the data collection device is optimally positioned (both orientation and distance), then the intensity of the reflected light will generally be more consistent across the barcode 12. If the data collection device 10 is aimed too far to the left or to the right of the barcode 12, then (due to the relatively narrow focus of the scanning laser beam) no modulated return signal is received (since the laser beam has "missed" the barcode 12) or the returned signal is not modulated in a recognizable way (such as if only a portion of the barcode 12 is scanned by the laser beam).

Such changes in intensity of the reflected light can be represented as digital data by the A/D converter 50. The changes in intensity and their location during the scan can be examined by the microprocessor 34 (such as by comparing this data with predefined and stored values) to determine the actual position of the data collection device 10 relative to an optimal position. The microprocessor 34 is able to represent the information indicative of the actual position on the display output 56, as will be described below. Other parameters of the reflected light, alternatively or additionally to intensity may be used as well to determine distance and orientation.

In the context of the radio 32 used to communicate with an RFID tag, the antenna 30 receives signals sent from the RFID tag. The antenna 30 can be a highly directional antenna that provides best reception when the data collection device 10 is optimally positioned. Therefore, the strength of the signal received by the antenna 30 can provide an indication as to whether the orientation of the data collection device 10 is optimum, as well as an indication of whether the data collection device 10 is at an optimum range/distance.

Figure 3:
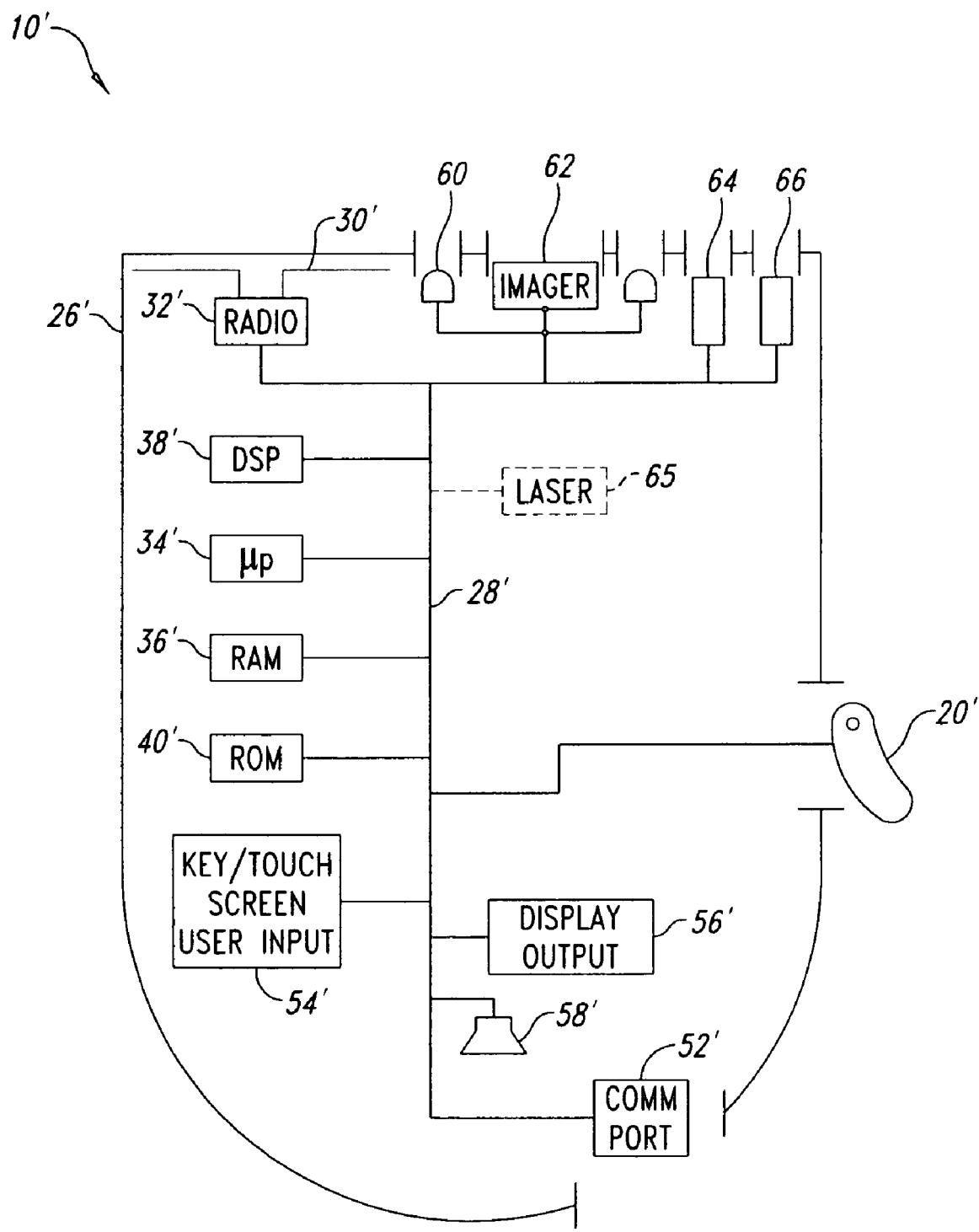
FIG. 3 is a block diagram of another embodiment of a data collection device.

FIG. 3 shows another embodiment of a data collection device 10', wherein like parts as those of the embodiment of FIG. 1 have been labeled with the prime (') symbol and are not described in further detail. The data collection device 10' includes a flood illumination source 60, such as a plurality of light sources, to substantially illuminate a target data carrier. An imager or other image sensor 62 is positioned to receive illumination reflected from the target data carrier. Such symbol reading components may be used to read matrix codes, for example.

A portion of the RAM 36' can temporarily store data, such as a captured image data from the image sensor 62. The ROM 40' contains instructions for the microprocessor 34' that permit the microprocessor 34' to control the image sensor 62 to capture image data and to decode and/or manipulate the captured image data.

The image sensor 62 can take the form of a one- or two-dimensional charge coupled device (CCD) array. In certain embodiments, the data collection device 10' can omit the illumination source 60, for example where the image sensor 62 is a two-dimensional CCD array operable with ambient light.

The data collection device 10' includes an output transducer 64 to emit electromagnetic radiation or acoustical energy from the housing 26' toward the target data carrier. An output transducer 66 receives electromagnetic radiation or acoustical energy at least partially returned from the target data carrier. To determine position, at least one parameter of the received electromagnetic radiation (or acoustical energy) is processed by the microprocessor 34' to determine the position of the automatic data collection device 10' with respect to the target data carrier.

The parameter that is processed can include a magnitude and direction of the received electromagnetic radiation or acoustical energy. The reflected electromagnetic radiation or acoustical energy will have generally smaller magnitude and will be highly directional if the data collection device 10' is not optimally positioned. This information can be therefore used to determine orientation. Another parameter to process can include a timing element, wherein a distance between the data collection device 10' and the target data carrier can be computed based on a time difference between when an acoustical signal is emitted from the output transducer 64 and when the reflected acoustical signal is received by the input transducer 66. With regards to electromagnetic radiation, the strength of the received electromagnetic radiation can also be correlated to distance.

Alternatively or additionally, the position of the data collection device 10' can be determined when the image sensor 62 captures an image of at least a portion of the target data carrier. The microprocessor 34' uses a set of processor-executable instructions (such as software) to determine an approximate amount of deviation between a focus of the image and an optimal focus of the image. Thus, the microprocessor 34' (and/or the DSP 38'), when processing that image using software, can determine the degree in which the image is out of focus and use this information to determine distance or orientation. For example, if the captured image is blurred, the amount of processing performed by the microprocessor 34' to interpret and sharpen the image can be correlated to whether the data collection device 10' needs to be positioned closer to or further from the target data carrier.

Attempts have been made at providing auto-focus capability in barcode readers. For example, a designed proposed by U.S. Pat. No. 5,574,598 (Nippondenso) employs an elastic change of the curvature of a transparent fluid-filled lens. A design proposed by Vdovin, et. al. "Micromachined mirror with a variable focal distance in Free-Space Microoptical Systems", Digest of EOS Topical Meeting, pp. 28–29, Apr. 1–3 1996 employs electrostatic deformation of the curvature of a mirror. A design proposed in U.S. Pat. No. 6,464,363 (Nishioka et. al.) employs an electrostatic mirror. Finally, a design proposed in U.S. Pat. No. 6,347,742 (Winarski et. al.) employs a variable focal length liquid crystal lens. Such compact adaptive lenses rely on the rotation of the liquid crystal under an electric field that produces a change of refraction index. Principles of liquid crystal lenses are further described in "Adaptive Optical Components Using Liquid Crystal Devices", G. D. Love, Journal of the Communications Research Laboratory, Vol. 46 No. 3, November 1999, pp. 427–430. Techniques disclosed in these publications may be implemented by an embodiment to determine focus and/or focus deviation, for purposes of determining a position of the data collection device 10' with respect to the target data carrier.

U.S. patent application Ser. No. 11/040,485, entitled "AUTOFOCUS BARCODE SCANNER AND THE LIKE EMPLOYING MICRO-FLUIDIC LENS," assigned to the same assignee as the present application and incorporated herein by reference discloses techniques for autofocus using active and passive methods. A microprocessor or other processor actuates an active range finding system, for example by causing a range finder output device to emit electromagnetic radiation or a pressure pulse. The microprocessor or other processor receives the range finder input from a range finder input device. The microprocessor or other processor determines the distance between the target and a portion of the data collection device, for example a microfluidic lens assembly. For example, the microprocessor may determine a duration or a frequency or phase shift between the sent and received range finder signals (e.g., electromagnetic energy or pressure pulses).

In one embodiment, the data collection device 10' (and/or any other data collection device discussed herein) may include a laser 65, which is shown in broken lines in FIG. 3. The laser 65 can be used for aiming or other range-finding operation, for example by aiming light at a target data carrier and calculating or otherwise determining the amount of time elapsed to receive returned/reflected light. The amount of time is indicative of a distance between the data collection device 10' and the target data carrier. In another embodiment, the intensity of the returned light or other light characteristic can also be used to determine distance and/or orientation.

The image sensor 62 and/or some other imager can be used to receive the returned laser light. Such a laser-aiming and imaging embodiment can implement linear imagers, 2D imagers, linear and 2D imagers, or other types of imagers and light sources.

After the actual position of the data collection device 10' is determined using these techniques, a difference between the determined position and the optimal position can be determined by the microprocessor 34'. In one embodiment in the context of distance, such a difference is determined as at least one of a magnitude and direction of a difference between the actual determined distance and the optimal distance between the data collection device 10' and the target data carrier. In one embodiment in the context of orientation, such a difference is determined as a difference between the actual determined orientation and the optimal orientation between the data collection device 10' and the target data carrier. Once the differences are determined, the microprocessor 34' can use this information to activate the appropriate visual indicators 56' so as to represent the position of the data collection device 10' with respect to the target data carrier.

Figure 4:
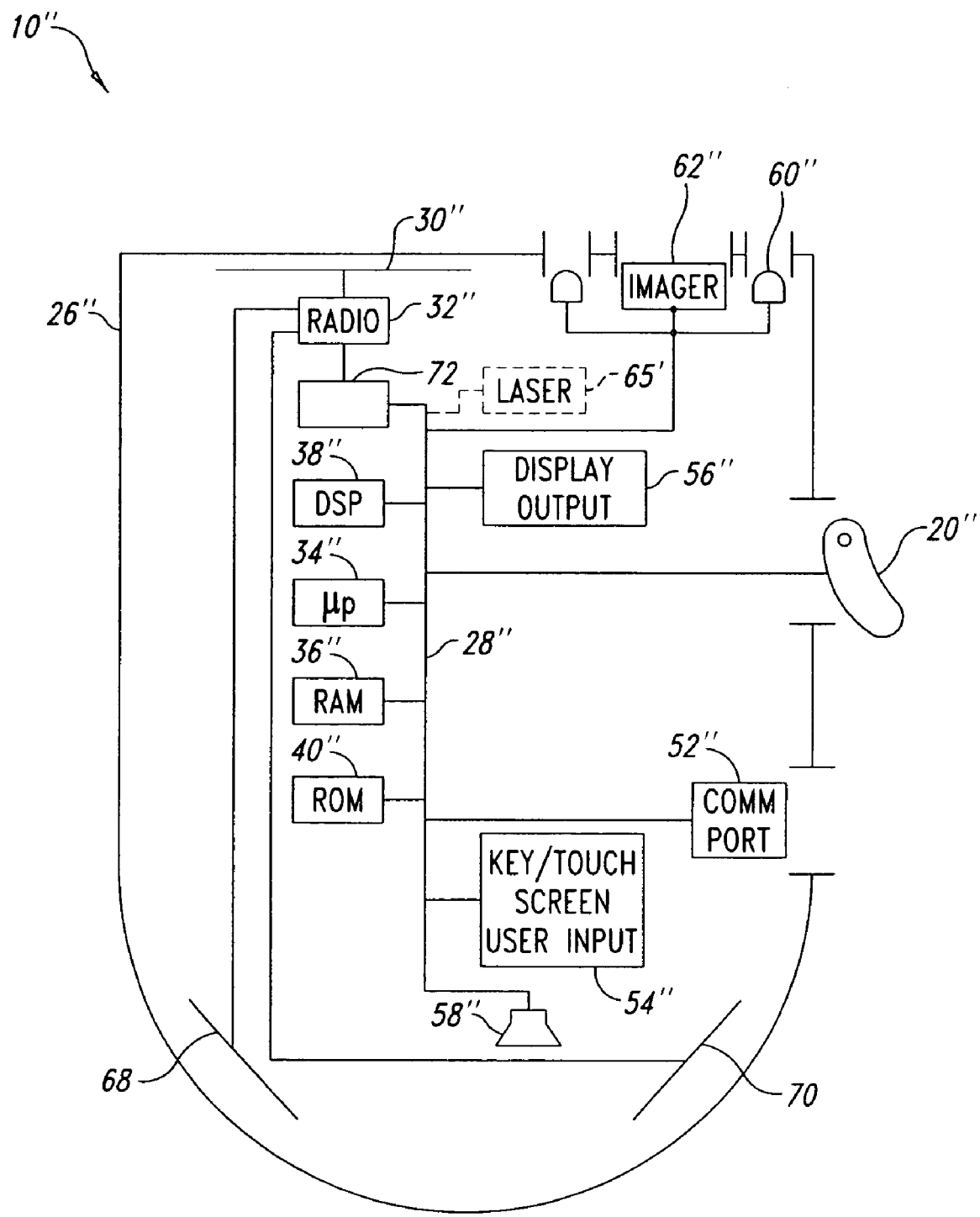
FIG. 4 is a block diagram of yet another embodiment of a data collection device.

FIG. 4 shows another embodiment of a data collection device 10", wherein parts similar to the previous embodiments are denoted with a double prime (") symbol. To determine position, a plurality of antennas 68 and 70 are provided along with the antenna 30". In an embodiment, the antennas 68 and 70 are coupled to the radio 32" and receive radio frequency signals reflected from the target data carrier. The received radio frequency signals are processed using triangulation techniques, wherein the location of a radio transmitter at the target data carrier can be determined by measuring either the radial distance or the direction (or other characteristic) of the received radio frequency signal from two or three different points.

In another embodiment, a plurality of infrared (IR) sources (such as LEDs) is provided in place of the antennas 68 and 70. Such LEDs are coupled to an IR unit 72. The LEDs are used to generate two IR beams that converge to indicate focus. The IR unit 72 can include an IR detector. When the data collection device 10" is optimally positioned, the IR beams converge at the target data carrier, and one or more IR signals is reflected back to and detected by the IR unit 72. If the data collection device 10" is not at an optimal distance (i.e., too far or too close to the target data carrier), then the two IR beams do not converge at the target data carrier, thereby resulting in the reflection of two spaced-apart return IR beams detected by the IR unit 72.

In another embodiment, the data collection device 10" can be provided with a laser 65' for range finding, similar to an embodiment described with respect to FIG. 3 above. The image sensor 62" can be used to detect laser light returned from the target data carrier and/or a photodetector (such as the photodetector 42 of FIG. 2) may be used for detection of the returned light. Distance can be calculated based on the time elapsed to receive the returned light, or based on some other characteristic associated with the returned light.

FIGS. 5A–9B show various embodiments of visual indicators 56 for the data collection device(s) of FIGS. 1–4. The visual indicators can be produced in any of a variety of manners capable of producing a visual indication within a field-of-view of the user. For example, the visual indicators may be produced by selectively actuable light sources, such as light emitting diodes (LEDs) or incandescent light bulbs. Alternatively, or additionally, the visual indicators may be produced by one or more selectively actuable/operable portions (e.g., pixels) of one or more liquid crystal displays (LCDs). Alternatively, or additionally, the visual indicators can be produced by one or more individually addressable and selectively operable pixels of a display device such as a cathode ray tube (CRT), field emission display (FED), or plasma display, which can be mounted on the head 16 of the data collection device 10. Thus, the data collection device 10 can employ any of a variety of technologies to produce the display of position information including, but not limited to, LED, incandescent, LCD, CRT, FED, lasers, and so forth. For the sake of simplicity of explanation and illustration and without limitation, the visual indicators will be described only in the context of pixels of a LCD in FIGS. 5A, 6A, 7A, and 8A, and in the context of LEDs in counterpart FIGS. 5B, 6B, 7B, and 8B.

In the embodiment of FIG. 5A, a LCD 80 is disposed on the head 16 and includes a set of pixels 82. The pixels 82 generally extend along a line parallel to the line-of-sight axis 21, and include an optimal position indicator, such as a middle pixel 84 located between two outermost ones of the line of pixels 82. The microprocessor 34 is configured to activate a far side pixel relative to the user as viewed by the user along the line-of-sight axis 21 (i.e., an uppermost pixel) if a distance between the data collection device 10 is greater than an optimal distance. Alternatively, the microprocessor 34 is configured to activate a near side pixel relative to the user as viewed by the user along the line-of-sight axis 21 (i.e., lowermost pixel) if the distance between the data collection device 10 is greater than the optimal distance. The microprocessor 34 is configured to activate the pixel 84 (or its adjacent pixel) as the data collection device 10 approaches the optimal distance. The LEDs 82' of FIG. 5B are arranged and operate in a manner analogous to the pixels 82 described in FIG. 5A, and so will not be described in further detail.

According to one embodiment, the pixels 82 can further comprise different color. A most distal activated pixel can produce a color that is different than more proximate activated pixels, thereby further representing distance and/or orientation. Alternatively or additionally to color, audio from the speaker 58 can also be provided in any one or all of the embodiments shown in FIGS. 5A–9B as a further or alternative indicator of distance and/or orientation. Such audible indicators can mimic the feed back provided by the visual indicators, via use of audible beeps, pulses, tones, recorded or synthesized human voice audio (e.g., "move more to the left"), and other audio. Further alternatively or additionally, the pixels can all comprise the same color but have different intensities corresponding to different positions (e.g., a brightest intensity can indicate that the data collection device 10 is optimally positioned, as compared to a non-optimal position indicated by an activated pixel of lower intensity). Thus, different types of indications can be provided by the visual indicators.

In the embodiment of FIG. 6A, pixels 86 extend generally along a curved line that is generally perpendicular to the line-of-sight axis 21. An optimal position indicator 88 is located adjacent to the center of the curved line between the outermost pixels, and is indicative of an optimal position of the data collection device 10. In this embodiment, activation of pixels 86 to the left or right of the optimal position indicator 88 is indicative of whether an orientation of the data collection device 10 (as viewed by the user along the line-of-sight axis 21) is, respectively, too far to the left or to the right of the optimal orientation. That is, as analogously in FIGS. 5A and 5B, the microprocessor 34 is configured to activate a pixel that is spaced from the optimal position indicator 88 by a number of positions indicative of a difference between the actual position of the data collection device 10 with respect to the target data carrier and an optimal position of the data collection device 10 with respect to the target data carrier. As the position of the data collection device 10 changes, the microprocessor 34 is configured to sequentially activate a number of pixels between the optimal position indicator 88 and a most distal pixel. The LEDs 86' of FIG. 6B are arranged and operate in a manner analogous to the pixels 86 described in FIG. 6A, and so will not be described in further detail.

In the embodiment of FIG. 7A, there are first and second sets of pixels 90 and 92, respectively, both of which generally extend along a line perpendicular to each other in a T-shape. An optimal position indicator 94 can comprise a pixel where the first and second sets of pixels 90 and 92 intersect, and is or is proximate to the outermost pixel in the first set of pixels 90. The microprocessor 34 is configured to activate pixels, of the second set of pixels 92, to the left or right side of the optimal position indicator 94 to match an orientation of the data collection device 10 with respect to the target data carrier as viewed by the user along the line-of-sight axis 21. The microprocessor 34 is configured to activate pixels, of the first set of pixels 90, below the optimal position indicator 94 to match distance of the data collection device 10 with respect to the target data carrier. FIG. 7B shows first and second sets of LEDs 90' and 92' that operate analogously to the pixels of FIG. 7A, and therefore will not be described in further detail herein.

In the embodiment of FIG. 8A, first and second sets of pixels 96 and 98 are provided. The first and second sets of pixels 96 and 98 generally extend along lines perpendicular to each other, wherein the first set of pixels 96 is parallel to the line-of-sight axis 21 and the second set of pixels 98 is perpendicular to the line-of-sight axis 21. Pixels in the first set of pixels 96 are selectively actuable by the microprocessor 34 to indicate an actual distance relative to an optimal distance, while pixels in the second set of pixels 98 are selectively actuable by the microprocessor 34 to indicate an actual orientation relative to an optimal orientation. A pixel 100 at an intersection of the lines of the first and second sets of pixels 96 and 98 represents an optimal position of the data collection device 10.

Figure 9A:
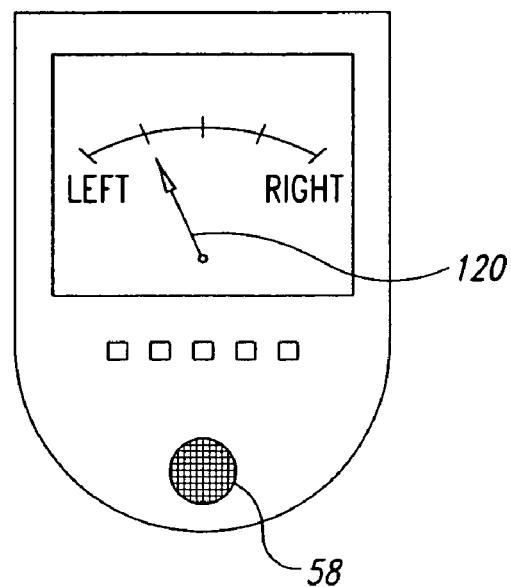
Figure 9B:
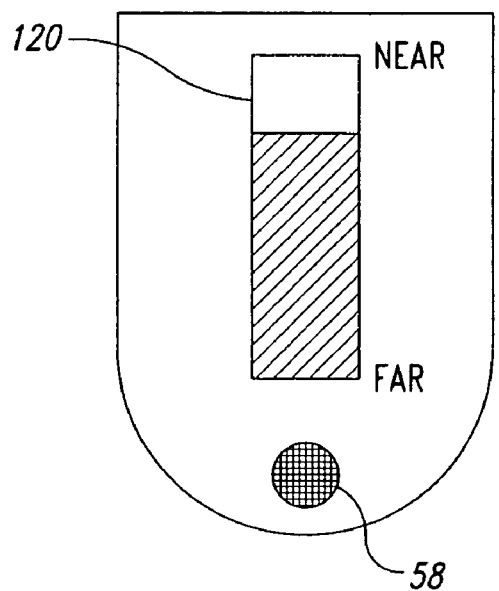

Example embodiments of visual indicators that provide graphical representations of position are shown in FIGS. 9A–9B. Such embodiments may be used alternatively or additionally to the embodiments shown in FIGS. 5A–8B. In FIG. 9A, a "compass-type" directional arrow 120 is provided to indicate orientation. The directional arrow 120 can be embodied as graphics displayable on a screen, pixels on a screen, LEDs, or with other display technology similar to those described with respect to FIGS. 5A–8B. An electromechanical component in one example embodiment can be used for the directional arrow 120.

In FIG. 9B, a graphical representation of a gauge 122 is provided. One embodiment of the gauge 122 can be used to indicate distance to the target data carrier (e.g., near and far). The gauge 122 can be embodied as graphics or other suitable display mechanism.

Figure 10:
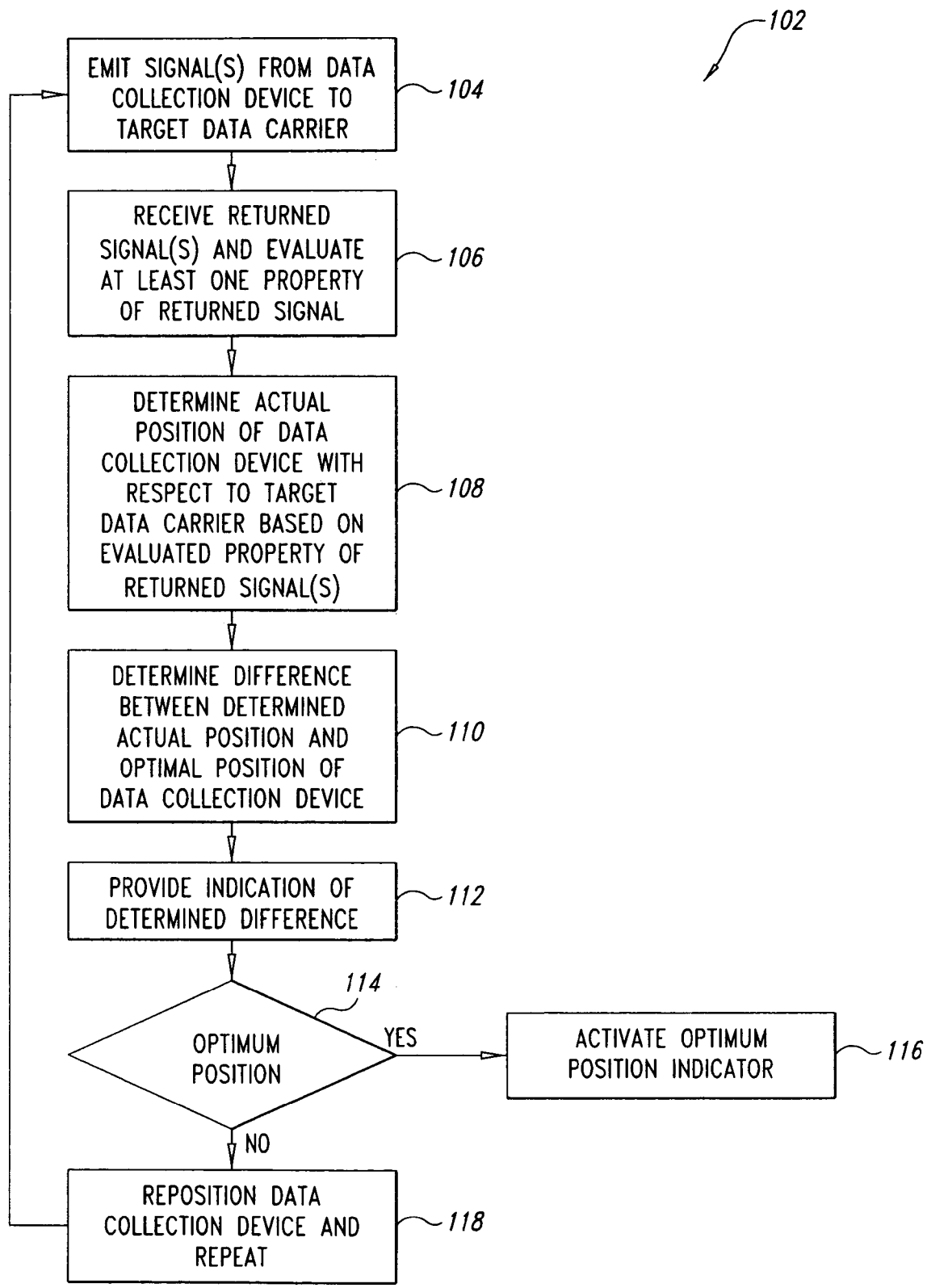
FIG. 10 is a flowchart of a technique to provide visual and/or audible indication representative of an actual or at least approximate position of a data collection device relative to an optimal position.

FIG. 10 is a flowchart 102 of a technique to provide visual indication representative of an actual position of the data collection device 10 relative to an optimal position. In an embodiment, at least some of the operations depicted in the flowchart 102 can comprise software or other machine-readable instructions executable by a processor (such as the microprocessor 34) and stored on a machine-readable medium (such as the RAM 36 or the ROM 40). It is appreciated that the operations depicted in the flowchart 102 need not necessarily occur in the exact order shown, and that certain operations can be suitably added, removed, combined, or modified.

At a block 104, the data collection device emits one or more signals towards the target data carrier. As previously described above with reference to FIGS. 2–4, such signals can comprise electromagnetic radiation, acoustical energy, radio frequency signals, laser light, infrared signals, and the like. In an embodiment, the operations at the block 104 can further involve capturing an image of the target data carrier (which is later processed to determine a focus deviation for purposes of determining distance, at a subsequent block 106).

At the block 106, the data collection device 10 receives one or more returned signals from the target data carrier. At least one property of the returned signal is evaluated at the block 106, including but not limited to, a strength, direction, time difference, scattering, focus, triangulation information, or other parameters or characteristics of the returned signal (s) that are indicative of distance and orientation of the data collection device 10 with respect to the target data carrier.

Based on the evaluated property of the returned signal(s), the actual position of the data collection device 10 with respect to the target data carrier is determined at a block 108. For example, the microprocessor 34 can correlate a determined strength and direction of the received signal with corresponding position data present in a lookup table. Alternatively or additionally, the microprocessor 34 can execute code having formulas or algorithms that determine the actual position based on knowledge of the strength, direction, focus, time difference, or other property of the returned signal(s).

At a block 110, the difference between the determined actual position and the optimal position of the data collection device is determined. Again, such determination can be performed via use of a lookup table, execution of code, execution of algorithms, or via other techniques. The microprocessor 34 provides a visual and/or audible indication of the determined difference at a block 112. For instance and as depicted in the embodiments of FIGS. 5A–8B, the visual indication of the determined difference can be represented by a number of pixels (or LEDs) distanced from an optimum position indicator. Graphical means for representing distance and/or orientation may also be provided as depicted in FIGS. 9A–9B.

If the data collection device 10 is at the optimum position (as determined by the microprocessor 34 at a block 114), then the optimum position indicator is activated or otherwise made visible to the user at a block 116. The determination of the optimum position at the block 114 can be performed in several ways. For example, the data collection device 10 is at the optimum position when the determined difference between the actual position and the optimum position is substantially zero(0). Alternatively or additionally, lookup tables, formulas, algorithms, executed code, and the like can be used to determine whether the optimum position is present. In such embodiments, parameters for the optimum position can be preset into the data collection device 10 (such as via storage in the ROM 40 as a lookup table, variables, or other data structure), so that information associated with the determined position can be suitably compared with parameters for the optimum position.

If the data collection device is determined to not be at the optimum position at the block 114 (and as further visually indicated at the block 112), then the user can re-position the data collection device 10 at a block 118. The process described above then repeats to determine whether the new location of the data collection device 10 is at the optimum position.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, specific examples of arrangements, numbers of pixels or LEDS, and labeling of the visual indicators have been shown and described. It is appreciated that other embodiments may use different arrangements, numbers of pixels or LEDS, labeling, audible indicators, and the like to represent distance and orientation relative to an optimum position of a data collection device with respect to a target data carrier.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An automatic data collection device for reading data carriers such as machine-readable symbols and radio frequency identification transponders, the automatic data collection device comprising:
   a housing;
   a symbol reading means carried by the housing for optically reading information encoded in machine-readable symbols;
   a radio frequency identification reading means carried by the housing for wireless reading information stored in radio frequency identification transponders;
   a position determining means carried by the housing for determining at least one of: 1) at least an approximate distance between the automatic data collection device and a target data carrier relative to an optimal distance between the automatic data collection device and the target data carrier, and/or 2) at least an approximate orientation of the automatic data collection device with respect to the target data carrier relative to an optimal orientation between the automatic data collection device and the target data carrier; and
   a visual indication means carried by the housing for providing a visual indication of the determined at least one of: 1) at least an approximate distance between the automatic data collection device and a target data carrier relative to an optimal distance between the automatic data collection device and the target data carrier, and/or 2) at least an approximate orientation of the automatic data collection device with respect to the target data carrier relative to an optimal orientation between the automatic data collection device and the target data carrier,
   wherein the position determining means comprises an output transducer operable to emit acoustical energy from the housing toward the target data carrier and an input transducer to receive acoustical energy returned from the target data carrier.

2. The automatic data collection device of claim 1 wherein the symbol reading means comprises a flood illumination source operable to substantially simultaneously illuminate approximately all of a machine-readable symbol and an image sensor positioned to receive illumination reflected from the machine-readable symbol.

3. The automatic data collection device of claim 2 wherein the position determining means further comprises a set of processor executable instructions to determine an approximate amount of deviation between a focus of an image captured by the image sensor and an optimal focus of the image.

4. The automatic data collection device of claim 1 wherein the symbol reading means comprises a laser selectively operable to emit a laser beam from the housing to successively illuminate portions of a machine-readable symbol and a photo detector positioned to receive a modulated laser beam reflected from the machine-readable symbol.

5. The automatic data collection device of claim 1 wherein the radio frequency identification reading means comprises a radio and at least a first antenna electrically coupled to the radio.

6. The automatic data collection device of claim 1 wherein the visual indication means comprises a first set of light emitting diodes selectively operable to indicate the determined distance between the automatic data collection device and the target data carrier.

7. The automatic data collection device of claim 1 wherein the visual indication means comprises a first set of pixels of a liquid crystal display selectively operable to indicate the determined distance between the automatic data collection device and the target data carrier.

8. The automatic data collection device of claim 1 wherein the visual indication means comprises a number of visual indicators generally extending along respective positions of a line representative at least one of the determined distance and the determined orientation.

9. An automatic data collection device for reading data carriers, the automatic data collection device comprising:
a housing;
an illumination source carried by the housing and selectively operable to provide illumination therefrom generally along a line-of-sight axis extending outward from the housing;
a photo sensor carried by the housing and having a field-of-view extending from the housing to receive reflected illumination;
at least a first antenna carried by the housing;
at least a first radio carried by the housing and coupled to at least the first antenna;
a first set of visual indicators carried by the housing and visible from an exterior thereof, each of the visual indicators in the first set of visual indicators located at a respective one of a number of positions extending generally along a first line; and
at least one processor coupled to selectively activate the visual indicators of the first set of visual indicators, the processor configured to activate a visual indicator in the first set of visual indicators that is spaced from an optimal position indicator by a number of positions indicative of a difference between at least an approximate position of the automatic data collection device with respect to a target data carrier and an optimal position of the automatic data collection device with respect to the target data carrier.

10. The automatic data collection device of claim 9 wherein the optimal position indicator is located between two outer most ones of the visual indicators of the first set of visual indicators.

11. The automatic data collection device of claim 10 wherein the first line extends generally perpendicularly with respect to the line-of-sight axis and the processor is configured to activate the visual indicator on a side of the optimal position indicator matching an orientation of the target data carrier with respect to automatic data collection device as viewed by a user of the automatic data collection device along the line-of-sight axis.

12. The automatic data collection device of claim 11 wherein the first line is curved.

13. The automatic data collection device of claim 10 wherein the first line extends approximately parallel with respect to the line-of-sight axis and the processor is configured to activate the visual indicator on a far side of the optimal position indicator from a user of the automatic data collection device as viewed by the user along the line-of-sight axis if a distance between automatic data collection device and the target data carrier is greater than an optimal distance, and alternatively to activate the visual indicator on a near side of the optimal position indicator from the user of the automatic data collection device as viewed by the user along the line-of-sight axis if the distance between automatic data collection device and the target data carrier is less than the optimal distance.

14. The automatic data collection device of claim 13, further comprising:
a second set of visual indicators extending along a second line, the second line generally perpendicular to the first line, wherein the processor is further configured to activate the visual indicator on a side of the optimal position indicator matching an orientation of the automatic data collection device with respect to the target data carrier as viewed by a user of the automatic data collection device along the line-of-sight axis.

15. The automatic data collection device of claim 10 wherein the processor sequentially activates a number of visual indicators between the optimum position indicator and the most distal activated one of the activated indicators in the first set of visual indicators.

16. The automatic data collection device of claim 9 wherein the optimal position indicator is located proximate an outer most one of the visual indicators of the first set of visual indicators.

17. The automatic data collection device of claim 9 wherein the optimal position indicator is an outer most one of the visual indicators of the first set of visual indicators.

18. The automatic data collection device of claim 9 wherein the first set of visual indicators comprises a first set of light emitting diodes.

19. The automatic data collection device of claim 9 wherein the first set of visual indicators comprises a first set of pixels of a liquid crystal display.

20. The automatic data collection device of claim 9 wherein a most distal activated one of the visual indicators in each of the first set of visual indicators produces an indication different from any more proximate activated ones of the visual indicators in the first set of visual indicators.

21. The automatic data collection device of claim 9 wherein a most distal activated one of the visual indicators in each of the first set of visual indicators produces an indication of a different color from any more proximate activated ones of the visual indicators in the first set of visual indicators.

22. A method for use in an automatic data collection device, the method comprising:
determining a position of the automatic data collection device with respect to a target data carrier;
determining a difference between the determined position of the automatic data collection device with respect to a target data carrier and an optimal position of the automatic data collection device with respect to the target data carrier; and providing a visual indication of the determined difference between the determined and the optimal positions of the automatic data collection device with respect to the target data carrier, including activating a visual indicator in a first set of visual indicators that is spaced from an optimal position indicator by a number of positions indicative of the difference between the determined position of the automatic data collection device with respect to the target data carrier and the optimal position of the automatic data collection device with respect to the target data carrier.

23. The method of claim 22 wherein determining the position of the automatic data collection device with respect to the target data carrier comprises: determining a distance between the automatic data collection device and the target data carrier.

24. The method of claim 22 wherein determining the position of the automatic data collection device with respect to the target data carrier comprises: determining an orientation of the automatic data collection device with respect to the target data carrier.

25. The method of claim 22 wherein determining the position of the automatic data collection device with respect to the target data carrier comprises capturing an image of at least a portion of the target data carrier with an image sensor and determining an approximate amount of deviation between a focus of the image captured by the image sensor and an optimal focus of the image.

26. The method of claim 22 wherein determining the position of the automatic data collection device with respect to the target data carrier comprises emitting electromagnetic radiation from the automatic data collection device, receiving electromagnetic radiation at least partially reflected by the target data carrier at the automatic data collection device, and processing at least one parameter of the received electromagnetic radiation at least partially reflected by the target data carrier.

27. The method of claim 22 wherein determining the difference between the determined position of the automatic data collection device with respect to the target data carrier and the optimal position of the automatic data collection device with respect to the target data carrier comprises determining at least one of a magnitude and a direction of the difference between a determined distance between the automatic data collection device and the target data carrier and an optimal distance between the automatic data collection device and the target data carrier.

28. The method of claim 22 wherein determining the difference between the determined position of the automatic data collection device with respect to the target data carrier and the optimal position of the automatic data collection device with respect to the target data carrier comprises determining a difference between a determined orientation of the automatic data collection device with respect to the target data carrier and an optimal orientation between the automatic data collection device and the target data carrier.

29. The method of claim 22 wherein activating the visual indicator in the first set of visual indicators that is spaced from the optimal position indicator by the number of positions indicative of the difference between the determined position of the automatic data collection device with respect to the target data carrier and the optimal position of the automatic data collection device with respect to the target data carrier comprises activating a visual indicator on a side of the optimal position indicator matching an orientation of the target data carrier with respect to automatic data collection device as viewed by a user of the automatic data collection device along a line-of-sight axis.

30. The method of claim 22 wherein determining the position of the automatic data collection device with respect to the target data carrier comprises determining a distance between the automatic data collection device and the target data carrier based at least in part on a characteristic of at least one of optical or acoustical energy received at the automatic data collection device via the target data carrier, and
wherein determining the difference between the determined position of the automatic data collection device with respect to the target data carrier and the optimal position of the automatic data collection device with respect to the target data carrier comprises determining a difference between the determined distance and an optimal distance corresponding to an optimal wireless range.

31. The method of claim 22 wherein determining the position of the automatic data collection device with respect to the target data carrier comprises determining a distance between the automatic data collection device and a target data carrier based at least in part on a characteristic of a radio frequency signal received at the automatic data collection device via the target data carrier, and
wherein determining the difference between the determined position of the automatic data collection device with respect to the target data carrier and the optimal position of the automatic data collection device with respect to the target data carrier comprises determining a difference between the determined distance and an optimal distance corresponding to an optimal optical range.

32. A method for use in an automatic data collection device, the method comprising:
determining a position of the automatic data collection device with respect to a target data carrier, including: emitting acoustical energy from the automatic data collection device, receiving acoustical energy at least partially reflected by the target data carrier at the automatic data collection device, and processing at least one parameter of the received acoustical energy at least partially reflected by the target data carrier;
determining a difference between the determined position of the automatic data collection device with respect to a target data carrier and an optimal position of the automatic data collection device with respect to the target data carrier; and
providing a visual indication of the determined difference between the determined and the optimal positions of the automatic data collection device with respect to the target data carrier.

33. A method for use in an automatic data collection device, the method comprising:
determining a position of the automatic data collection device with respect to a target data carrier;
determining a difference between the determined position of the automatic data collection device with respect to a target data carrier and an optimal position of the automatic data collection device with respect to the target data carrier; and
providing a visual indication of the determined difference between the determined and the optimal positions of the automatic data collection device with respect to the target data carrier, including activating a visual indicator of a first set of visual indicators on a far side of an optimal position indicator from a user of the automatic data collection device as viewed by the user along a line-of-sight axis if a distance between automatic data collection device and the target data carrier is greater than an optimal distance, and alternatively to activate a visual indicator on a near side of the optimal position indicator from the user of the automatic data collection device as viewed by the user along the line-of-sight axis if a distance between automatic data collection device and the target data carrier is less than the optimal distance.

34. The method of claim 33, further comprising:
activating a visual indicator of a second set of visual indicators on a side of the optimal position indicator matching an orientation of the target data carrier with respect to automatic data collection device as viewed by the user of the automatic data collection device along the line-of-sight axis.

35. A computer-readable media storing instructions executable by a processor for operating an automatic data collection device, by:
 determining a position of the automatic data collection device with respect to a target data carrier;
 determining a difference between the determined position of the automatic data collection device with respect to a target data carrier and an optimal position of the automatic data collection device with respect to the target data carrier; and
 providing a visual indication of the determined difference between the determined and the optimal positions of the automatic data collection device with respect to the target data carrier, by;
 activating a visual indicator in a first set of visual indicators that is spaced from an optimal position indicator by a number of positions indicative of a difference between the determined position of the automatic data collection device with respect to the target data carrier and the optimal position of the automatic data collection device with respect to the target data carrier.

36. A computer-readable media storing instructions executable by a processor for operating an automatic data collection device, by:
 determining a position of the automatic data collection device with respect to a target data carrier;
 determining a difference between the determined position of the automatic data collection device with respect to a target data carrier and an optimal position of the automatic data collection device with respect to the target data carrier; and
 providing a visual indication of the determined difference between the determined and the optimal positions of the automatic data collection device with respect to the target data carrier, by:
 activating a visual indicator of a first set of visual indicators on a far side of an optimal position indicator from a user of the automatic data collection device as viewed by the user along a line-of-sight axis when a distance between automatic data collection device and the target data carrier is greater than an optimal distance, and alternatively to activate the visual indicator on a near side of the optimal position indicator from the user of the automatic data collection device as viewed by the user along the line-of-sight axis when a distance between automatic data collection device and the target data carrier is less than the optimal distance.

* * * * *